United States Patent [19]
Fujiwara et al.

[11] Patent Number: 6,141,824
[45] Date of Patent: Nov. 7, 2000

[54] BLOWER AND VACUUM DEVICE

[75] Inventors: Nobuaki Fujiwara, Hiroshima, Japan; Naoki Kikuchi; Robert G. Everts, both of Chandler, Ariz.

[73] Assignees: Ryobi North America, Inc., Anderson, S.C.; Ryobi Limited, Tokyo, Japan

[21] Appl. No.: 09/482,215

[22] Filed: Jan. 12, 2000

Related U.S. Application Data

[60] Division of application No. 08/860,584, Jul. 1, 1997, which is a continuation-in-part of application No. 08/604,507, Feb. 21, 1996, abandoned.

[30] Foreign Application Priority Data

Feb. 21, 1996 [WO] WIPO .................... PCT/JP97/00469
Aug. 28, 1996 [JP] Japan ..................... 8-245689

[51] Int. Cl.[7] ........................................ A47L 5/14
[52] U.S. Cl. ............................... 15/330; 15/405
[58] Field of Search ............................. 15/330, 331, 405

[56] References Cited

U.S. PATENT DOCUMENTS

| | | |
|---|---|---|
| Re. 33,050 | 9/1989 | Tuggle et al. . |
| 2,902,708 | 9/1959 | Riley . |
| 3,009,188 | 11/1961 | Martin ............................ 15/330 |
| 3,525,118 | 8/1970 | Viollet . |
| 3,683,446 | 8/1972 | Tell . |
| 4,325,163 | 4/1982 | Mattson et al. . |
| 4,644,606 | 2/1987 | Luerken et al. . |
| 4,663,799 | 5/1987 | Kiyooka . |
| 4,694,528 | 9/1987 | Comer et al. . |
| 4,718,140 | 1/1988 | Johnson . |
| 4,817,230 | 4/1989 | Kiyooka . |
| 5,222,275 | 6/1993 | Baker et al. . |
| 5,280,667 | 1/1994 | Coathupe . |
| 5,450,649 | 9/1995 | Turnbull . |
| 5,477,585 | 12/1995 | Hentzschel et al. . |
| 5,511,281 | 4/1996 | Webster . |
| 5,522,115 | 6/1996 | Webster . |
| 5,535,479 | 7/1996 | Pink et al. . |
| 5,560,078 | 10/1996 | Toensing et al. . |
| 5,586,359 | 12/1996 | Iida . |
| 5,588,178 | 12/1996 | Liu . |
| 5,604,954 | 2/1997 | Webster et al. . |
| 5,621,945 | 4/1997 | Howells . |
| 5,638,574 | 6/1997 | Haupt et al. . |
| 5,664,284 | 9/1997 | Brzoska ............................ 15/330 |
| 5,673,457 | 10/1997 | Webster et al. . |
| 5,701,632 | 12/1997 | Webster et al. . |
| 5,722,111 | 3/1998 | Sowell et al. . |

FOREIGN PATENT DOCUMENTS

| | | |
|---|---|---|
| 0 028 320 A2 | 10/1980 | European Pat. Off. . |
| 0 114 114 A1 | 1/1984 | European Pat. Off. . |
| 0 792 578 A2 | 9/1997 | European Pat. Off. . |
| 0 795 266 A3 | 9/1997 | European Pat. Off. . |
| 0 792 578 A3 | 11/1997 | European Pat. Off. . |
| 295 10 750 U1 | 10/1995 | Germany . |
| 295 19 900 U1 | 3/1996 | Germany . |
| 296 10 752 U1 | 10/1996 | Germany . |
| VI96A0028 | 2/1997 | Italy . |

OTHER PUBLICATIONS

Valex Mistral Brochure, 1996, 5 pages.
Flying Garden Vac Operator's Manual, 12 pages.
IDC Blower Vac Model 300 BV Owners's Manual, 12 pages.
IDC Blower Vac Model 300 BV–2 Parts Manual, 4 pages.

*Primary Examiner*—Chris K. Moore
*Attorney, Agent, or Firm*—Brooks & Kushman P.C.

[57] ABSTRACT

A blower nozzle (30) and a vacuum nozzle (40) extending in parallel with each other are connected to a main body (10) housing therein a fan (19) and a motor (20). The main body (10) is provided with a dust bag (50). In a vacuum mode, air is directly sucked from the vacuum nozzle and is introduced into the dust bag by the rotation of the fan. In a blower mode, the air similarly sucked from the vacuum nozzle is directed toward the blower nozzle.

3 Claims, 14 Drawing Sheets

BLOWER AND VACUUM DEVICE

This application is a divisional application of copending U.S. application Ser. No. 08/860,584 filed on Jul. 1, 1997, and further claims priority based on an application which is a continuation-in-part of U.S. application Ser. No. 08/604,507, now abandoned, filed Feb. 21, 1996, and further claims priority based on 35 U.S.C. §119 and 35 U.S.C. §371 to Japanese Patent Application No. 8-245689, filed Aug. 28, 1996 and International application PCT/JP97/00469, filed Feb. 20, 1997, respectively.

TECHNICAL FIELD

The present invention relates to a blower-vacuum apparatus, and more particularly, to a type thereof capable of switching between an air blowing blower mode and an air sucking vacuum mode.

BACKGROUND ART

A conventional blower-vacuum apparatus is disclosed in U.S. Pat. No. 4,870,714. According to the disclosed apparatus, an air suction port and an air discharge port are formed in a main body, so that the air suction port is in confrontation with a fan disposed in the main body and the air discharge port is positioned perpendicularly with respect to an axis of the fan. In a vacuum mode, the air suction port is connected to a suction tube (vacuum nozzle) and the air discharge port is connected to a dust bag. By rotation of the fan, air and dust is introduced into the suction tube and directed into the dust bag through the main body. In the blower mode, the suction tube is detached from the air suction port, and a filter is attached to an open end of the air suction port for preventing dust from being introduced into the main body. Further, the dust bag is detached from the air discharge port, and an air blower tube (blower nozzle) having a tapered shape in which a diameter is gradually reduced toward its tip is connected to the air discharge port. Accordingly, air passing through the filter and introduced into the main body is blown outside through the air blower tube.

However, each time the blower-vacuum apparatus disclosed in the U.S. Pat. No. 4,870,714 is switched between the vacuum mode and the blower mode, the suction tube and the filter must be exchanged and the dust bag and the air blower tube must be exchanged, which is troublesome.

Japanese Utility Model Application laid open publication No. Hei 4-80454 discloses a dust collecting apparatus in which a suction tube (vacuum nozzle) extending in a axial direction of a fan is connected to a main body, and an outlet tube extending in a direction perpendicular to the axis of the fan is connected to a dust bag through a joint. The joint is provided with a branch pipe to which a blower tube (blower nozzle) is connected through a rubber tube. A blower opening of the blower tube is positioned close to a suction opening of the suction tube. Air and dust introduced into the suction tube is directed into the dust bag through the main body, the outlet tube, and the joint. A part of the suction air is also directed to the blower tube through the branch pipe, so that the air is blown to a position close to the opening of the suction tube. Because of this air, rubbish and dust accumulated in indentations on the ground is blown out of the indentations to facilitate suction of the flying rubbish and dust into the suction tube.

However, the dust collecting apparatus disclosed in the laid open Utility Model Application publication No. Hei 4-80454 blows air during suction cleaning work so that a part of the suction air sucked through the suction tube is utilized for air blowing. Accordingly, the blowing air may contain dust, thereby lowering the dust-collecting efficiency of the device. Further, the device is not designed to operate in a blower mode only.

Japanese Utility Model laid open application publication No. Hei 3-92454 discloses a dust collecting apparatus in which one end of an air feed tube is connected to a blower and another end of the air feed tube is connected to a confluence tube which is connected to a dust bag. The confluence tube includes an air feed passage, a dust suction passage and a branch passage. Further, a pivotable change-over valve is provided in the confluence tube. The air feed passage approximately linearly connects the air feed tube and the dust bag. The dust suction passage branches off the air feed passage and has one end connected to a cleaning tube. The branch passage connects the air feed passage to the dust suction passage. In a vacuum mode, the change-over valve is pivotally moved to a position for closing an opening of the branch passage, so that the air from the blower is directed to the dust bag by way of the air feed tube, and the air feed passage. Because of this air flow, air in the dust suction passage is subjected to sucking, and therefore, the dust is sucked through the top end of the cleaning tube and is collected in the dust bag. In a blower mode, the change-over valve is pivotally moved to a position for closing an opening of the air feed passage, so that the air from the blower is directed to the cleaning tube by way of the air feed tube and the branch passage.

However, because the dust collection apparatus disclosed in the Japanese Utility Model Application publication No. Hei 3-92454 is designed to suck ambient air by flowing air, in comparison with the blower vacuum apparatus disclosed in U.S. Pat. No. 4,870,714, in which suction can be exclusively performed, suction power will be inferior assuming that the dust collection apparatuses have power sources with identical output. Further, since the pivotable change-over valve is directly exposed in the passage, dust and rubbish may become entangled in the valve and render the change-over valve inoperable.

Another conventional blower vacuum apparatus is shown in FIGS. 15 and 16. The apparatus includes a main body 310, a blower nozzle 330, and a vacuum nozzle 340. The main body 310 includes a fan case 313 accommodating a fan 319, a motor case 314 accommodating a motor 320, and a dust case 315 positioned below the motor case 314. A handle 312 is provided above the fan case 313. The fan case 313 has an upper wall in confrontation with the fan 319, and the upper wall is formed with grid like air inlet ports 313a. The dust case 315 is connected to a dust bag 350. The motor 320 has an output shaft 321 whose one end is connected to the fan 319. Another end of the output shaft 321 is connected to a cutter blade 318 positioned within the dust case 315.

The blower nozzle 330 extends in a direction perpendicular to the rotation axis of the fan 319, and has one end attached to the main body 310 and another end formed with an air blowing port 330a. The vacuum nozzle 340 extends in parallel with and integrally with the blower nozzle 330 and has one end attached to the main body 310 and another end formed with a suction port 340a. A change-over valve 373 is rotatably supported within the blower port 330a of the blower nozzle 330. The change-over valve 373 can be changed over between a vacuum mode position in which the valve shuts off the blower port 330a as shown in FIG. 15 and a blower mode position in which the valve opens the blower port 330a as shown in FIG. 16.

In the blower mode, if the change-over valve 373 is rotated to its blower mode position and the fan 319 is rotated, air is introduced into the fan case 313 through the grid like air inlet ports 313a formed at the upper wall of the fan case 313. The introduced air passes through the blower nozzle 330 and is blown outside out of the air blowing port 330a. In the vacuum mode, the change-over valve 373 is changed over to the vacuum mode position. However, similar to the blower mode, the rotation of the fan 319 introduces air into the fan case 313 through the air inlet ports 313a, and the introduced air passes through the blower nozzle 330 and is directed toward the air blowing port 330a. The air impinges on the change-over valve 373 and is turned reversely as indicated by an arrow A in FIG. 15. Thus, the air is fed into the vacuum nozzle 340. Because of the air stream, ambient air around the suction port 340a of the vacuum nozzle 340 is sucked because of the creation of negative pressure into the vacuum nozzle 340 as indicated by arrows B. Accordingly, dust can be sucked from the suction port 330a and the sucked dust is directed toward the cutter blade 318 as indicated by arrows C and is pulverized thereat, and is then collected in the dust collection bag 350.

However, in the conventional blower-vacuum apparatus shown in FIG. 15, powerful suction force cannot be provided, because suction of ambient air is achieved by the air stream similar to the dust collection apparatus described in the Japanese laid open Utility Model application publication No. Hei 3-92454. Further, dust may become entangled with the change-over valve rotatably supported at the air blowing port 330a so that change in operation mode may become difficult or impossible to perform.

It is therefore, an object of the present invention to provide a blower-vacuum apparatus capable of providing a strong suction force with a direct suction of air from a vacuum nozzle by rotation of a fan without utilization of suction of ambient air around the air stream, and capable of performing a smooth mode changing operation without adhesion or entanglement of dust in a change-over mechanism.

DISCLOSURE OF INVENTION

These and other objects of the present invention will be attained by providing a blower-vacuum apparatus including a main body, a blower nozzle having one end connected to the main body and another end formed with a blower port, a vacuum nozzle extending in parallel with and provided integrally with the blower nozzle, the vacuum nozzle having one end connected to the main body and another end formed with a suction port, a fan rotatably supported in the main body, a dust bag connected to the main body for receiving dust laden air which has been passing through an entire length of the vacuum nozzle from the suction port and for collecting the dust, and the improvement comprising a change-over mechanism 60 provided in the main body 10, 13, 14, 15 for selectively providing one of a vacuum mode position in which the air sucked from the suction port 40a is directed to the dust bag 50 and a blower mode position in which the sucked air is directed to the blower nozzle 30, the air being directly sucked exclusively from the suction port 40a during the vacuum mode by the rotation of the fan 19.

With this arrangement, ambient air is not sucked by the air stream, but air is directly sucked exclusively from the suction port of the vacuum nozzle upon rotation of the fan, and therefore sufficient suction force is provided. Further, fixedly held vacuum and blower nozzles are used during both the vacuum mode and blower mode. Accordingly, exchange in components is not required at every switching between the vacuum mode and the blower mode.

Furthermore, since the vacuum mode operation is not performed concurrently with the blower mode operation but these operations are carried out independently of each other, the probability of mixing of dust with the blowing air can be reduced.

The change-over mechanism 60 preferably includes a change-over lever 61 positioned outside of the main body 15 and pivotally movably supported to the main body 15 at its supporting portion, a shield member 71, 71A rotatably disposed in the main body 15 and connected to the change-over lever 61 for passing or blocking the sucked air, the shield member 71, 71A having a wall portion 72 in confrontation with the supporting portion of the main body 15, and preferably, a guard member 81, 81B is positioned in the main body 15 and fixed thereto for preventing the dust from entering a space between the wall portion 72 and the supporting portion where the change-over lever 61 is supported. The wall portion 72 is covered by the guard member 81, 81B. Furthermore, the blower port 30a preferably has a cross-sectional area smaller than that of the suction port 40a.

With this structure, because the guard member is provided, change-over operation of the change-over mechanism is never obstructed by the entry of the dust into the change-over mechanism. Thus, change-over operations between the blower mode and the vacuum mode can be smoothly performed. Because the cross-sectional area of the blower port is smaller than that of the suction port, air velocity blowing out of the blower nozzle during the blower mode is higher than air velocity sucked into the vacuum nozzle. Accordingly, leaves and large trash are blown away, and not sucked in through the suction port.

In accordance with the present invention, there is provided a blower-vacuum apparatus including a housing 113 having an air introduction port 113b for air blowing and a dust port 118 for air suction, an impeller 119 having an air inlet side 119b and an air blower side 119a, the air inlet side 119b being selectively communicable with the air introduction port 113b and the air blower side 119a being selectively communicable with the dust port 118, a motor 120 for driving the impeller 119, a vacuum nozzle 140 connected to the housing 113 adjacent the inlet side 119b of the impeller 119, a blower nozzle 130 connected to the housing 113 adjacent the blower side 119a of the impeller 119, a first shield member 173 for selectively opening and closing the air introduction port 113b, the air inlet side 119b being in fluid communication with the vacuum nozzle 140 when the first shield member 173 closes the air introduction port 113b, and the air inlet side 119b being shut off from the vacuum nozzle 140 when the first shield-member 173 opens the air introduction port 113b, and a second shield member 174 for selectively opening and closing the dust port 118, the air blower side 119a being in fluid communication with the blower nozzle 130 when the second shield member 174 closes the dust port 118, and the air blower side 119a being shut off from the blower nozzle 130 when the second shield member 174 opens the dust port 118.

In accordance with the present invention, there is further provided a blower vacuum apparatus including the above described housing, the impeller, the motor, the vacuum nozzle, the blower nozzle, a first shield member switchable between a first position where the first shield member closes the air introduction port and provides fluid communication between the vacuum nozzle and the air inlet side and a second position where the first shield member opens the air introduction port and shuts off a fluid communication between the vacuum nozzle and the air inlet side, and a second shield member switchable between a first switch position where the second shield member opens the dust port and shuts off a fluid communication between the blower nozzle and the blower side and a second switch position where the second shield member closes the dust port and provides a fluid communication between the blower nozzle and the blower side, and change-over interlocking means 260 for interlockingly switching the second shield member to its first switch position upon switching of the first shield member to its first position for providing a vacuum mode, and for interlockingly switching the second shield member to its second switch position upon switching of the first shield member to its second position for providing a blower mode.

BRIEF DESCRIPTION OF DRAWINGS

In the drawings:

FIGS. 8A through 8C are views for description of operational order for locking the vacuum mode in the blower-vacuum apparatus according to the first embodiment and in which:

FIG. 8A shows a state in which a projecting portion of a change-over lever is riding on a slanting portion of a resilient member;

FIG. 8B shows a state in which the projecting portion has just climbed up a top of the resilient member; and FIG. 8C shows a state in which the projecting portion is brought into engagement with a recessed portion of the resilient member;

BEST MODE FOR CARRYING OUT THE INVENTION

Figure 1:
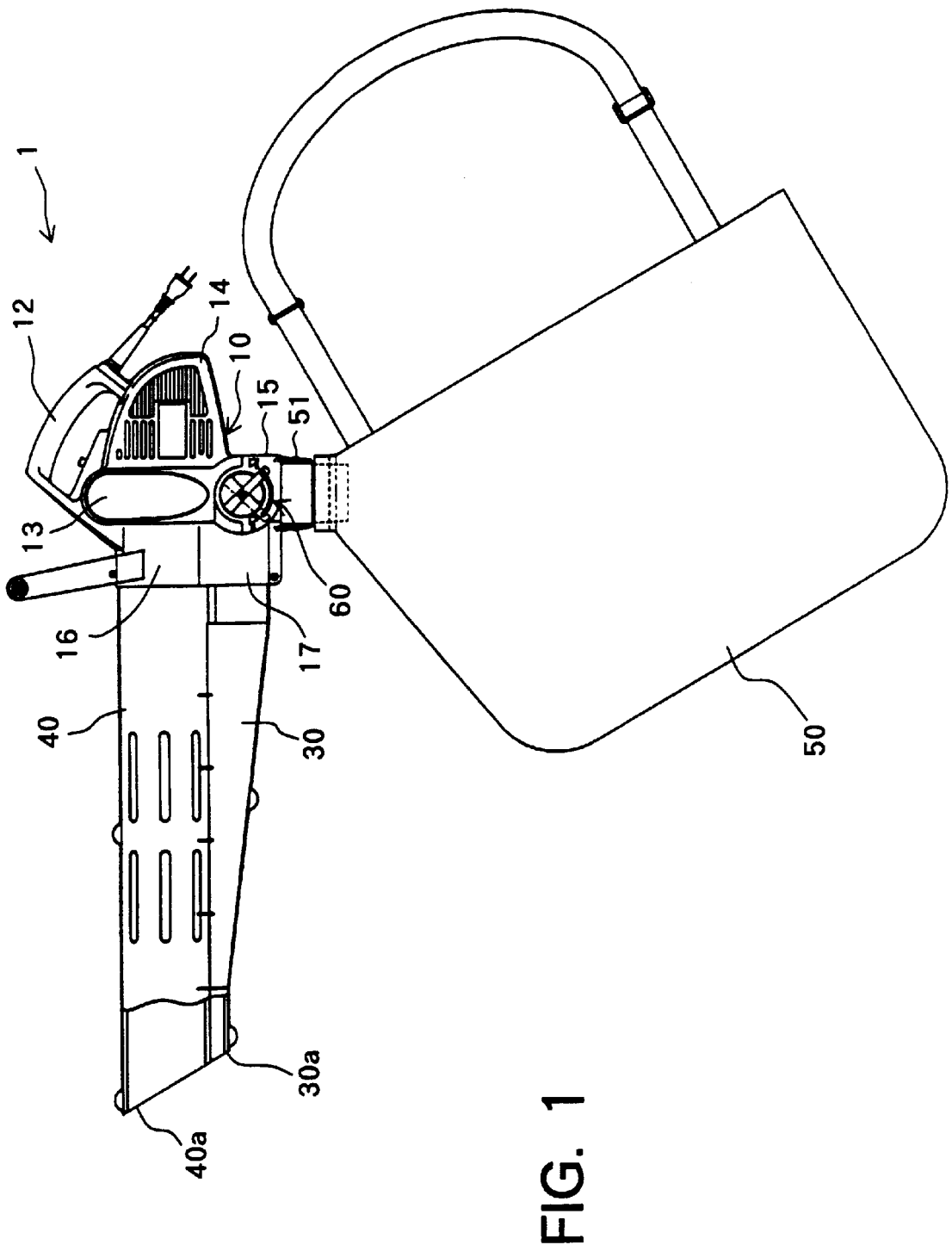
FIG. 1 is a partially cross-sectional side view showing a blower-vacuum apparatus according to a first embodiment of the present invention.

A blower-vacuum apparatus according to a first embodiment of the present invention will be described with reference to FIGS. 1 through 8. The blower-vacuum apparatus 1 includes a main body 10, a blower nozzle 30 connected to the main body 10, a vacuum nozzle 40, and a dust bag 50. The main body 10 has an upper portion provided with a handle 12 to which a power cord 11 is connected. The main body 10 integrally provides a fan case 13, a motor case 14 positioned behind the fan case 13, and a branch chamber 15 positioned below the fan case 13.

Figure 3:
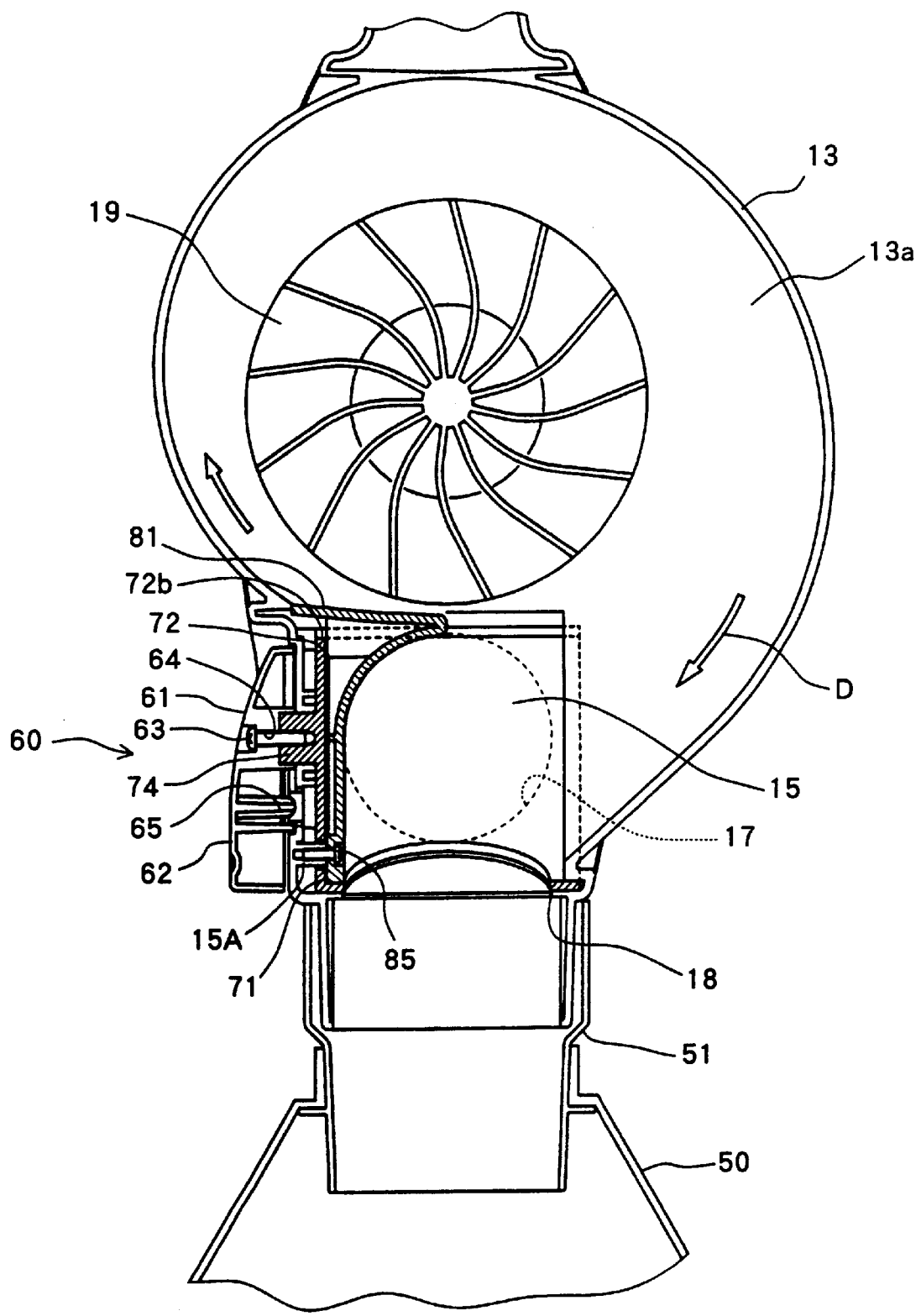
FIG. 3 is a cross-sectional view taken along the line III—III of FIG. 2.
Figure 4:
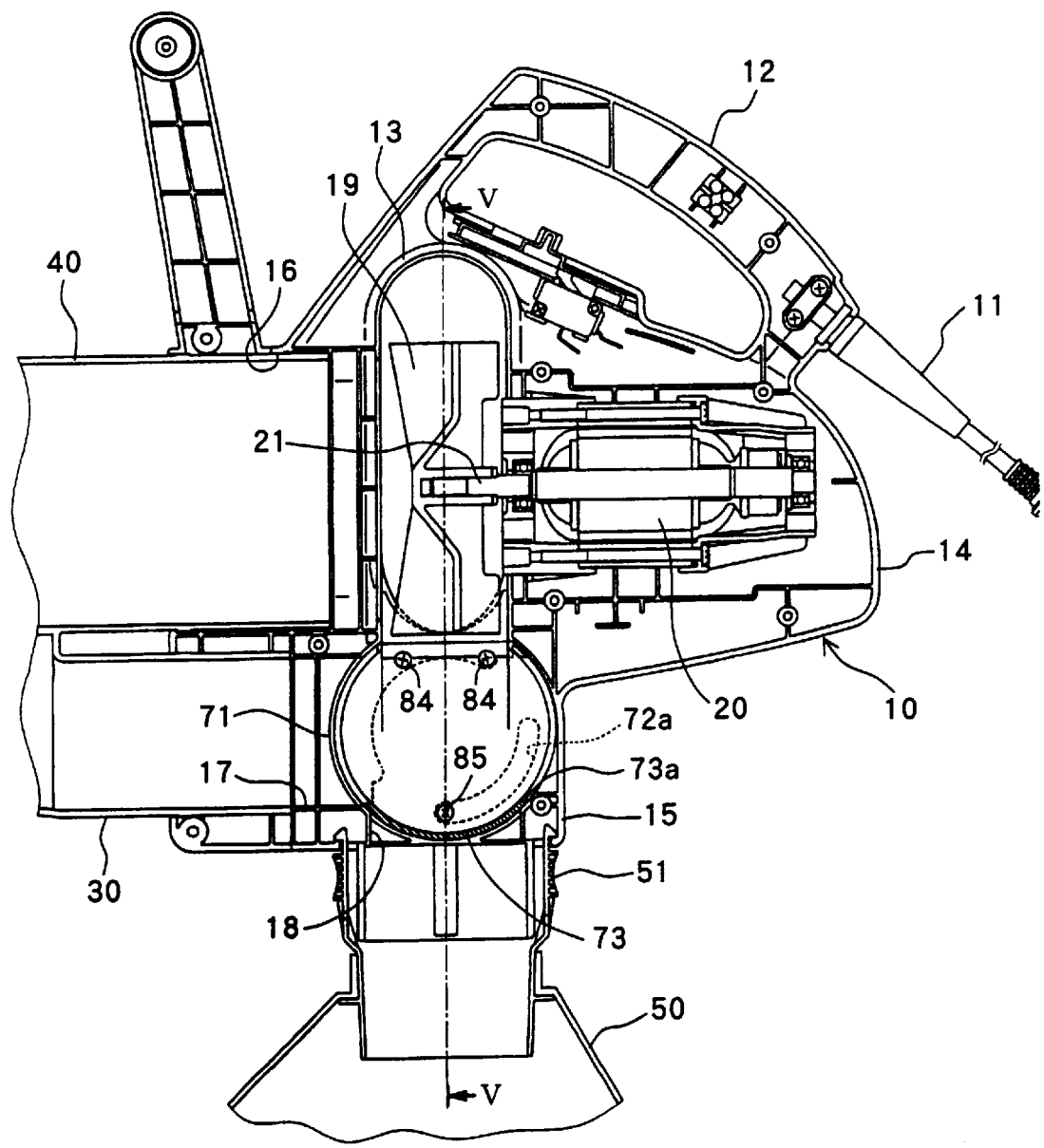
FIG. 4 is a cross-sectional view showing the blower-vacuum apparatus in its blower mode according to the first embodiment.
Figure 5:
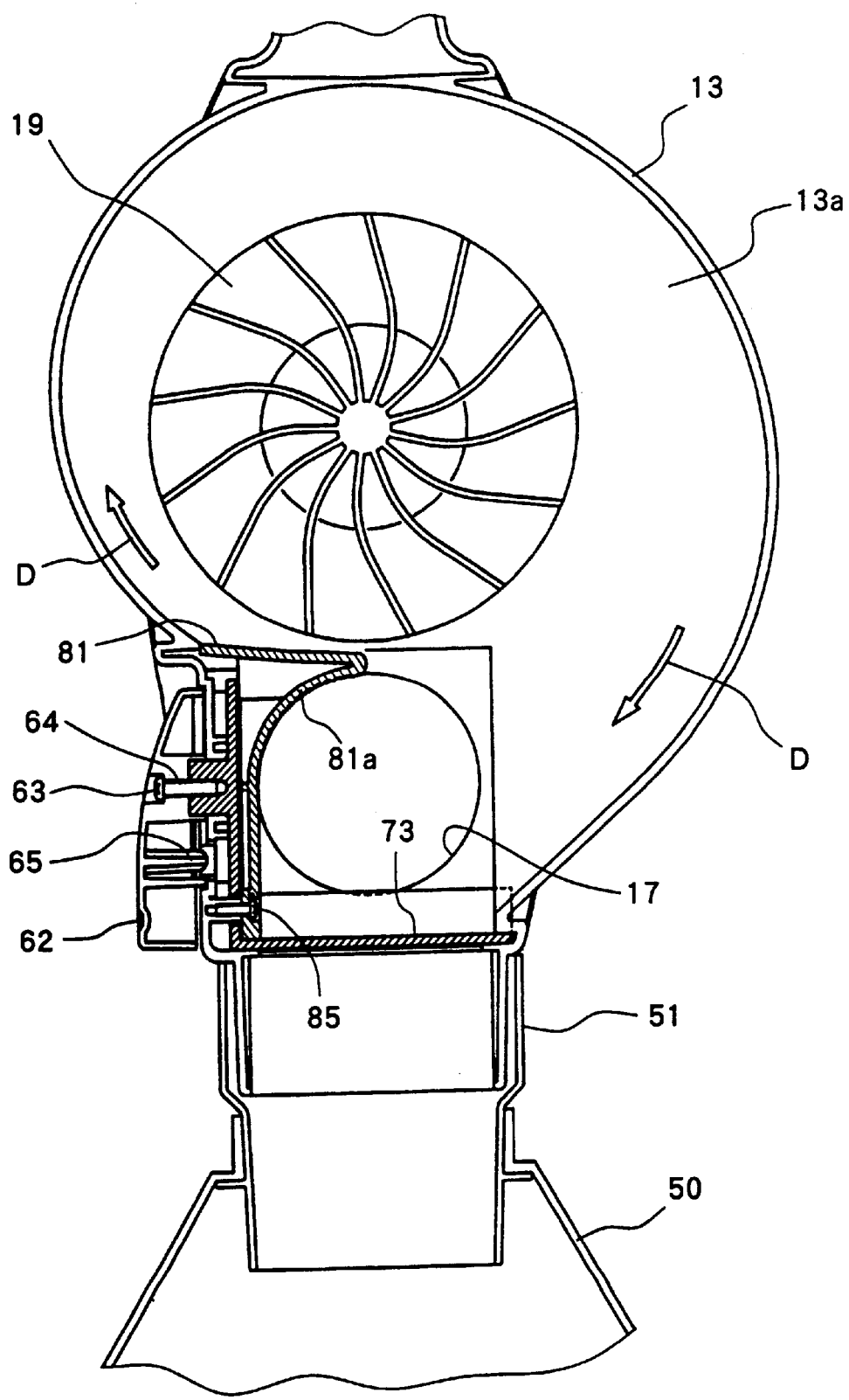
FIG. 5 is a cross-sectional view taken along the line V—V of FIG. 4.

A suction collar 16 is provided in front of the fan case 13 for allowing a rear portion of the vacuum nozzle 40 to be inserted thereinto. Further, a blower collar 17 is provided in front of the branch chamber 15 for allowing a rear portion of the blower nozzle 30 to be inserted thereinto. The suction collar 16 and the blower collar 17 are arranged in vertical alignment. A dust port 18 is formed at a lower portion of the branch chamber 15. A fan 19 is rotatably disposed in the fan case 13, and a motor 20 is accommodated in the motor case 14. The motor has an output shaft 21 connected to the fan 19. The fan 19 has an acutely angled edge serving as a cutter, so that the fan can pulverize relatively large trash into small pieces when the trash passes through the fan 19. As shown in FIG. 3, a scrolled air passage 13a is formed between the fan 19 and the fan case 13 and running from the suction collar 16 to the branch chamber 15.

Figure 6:
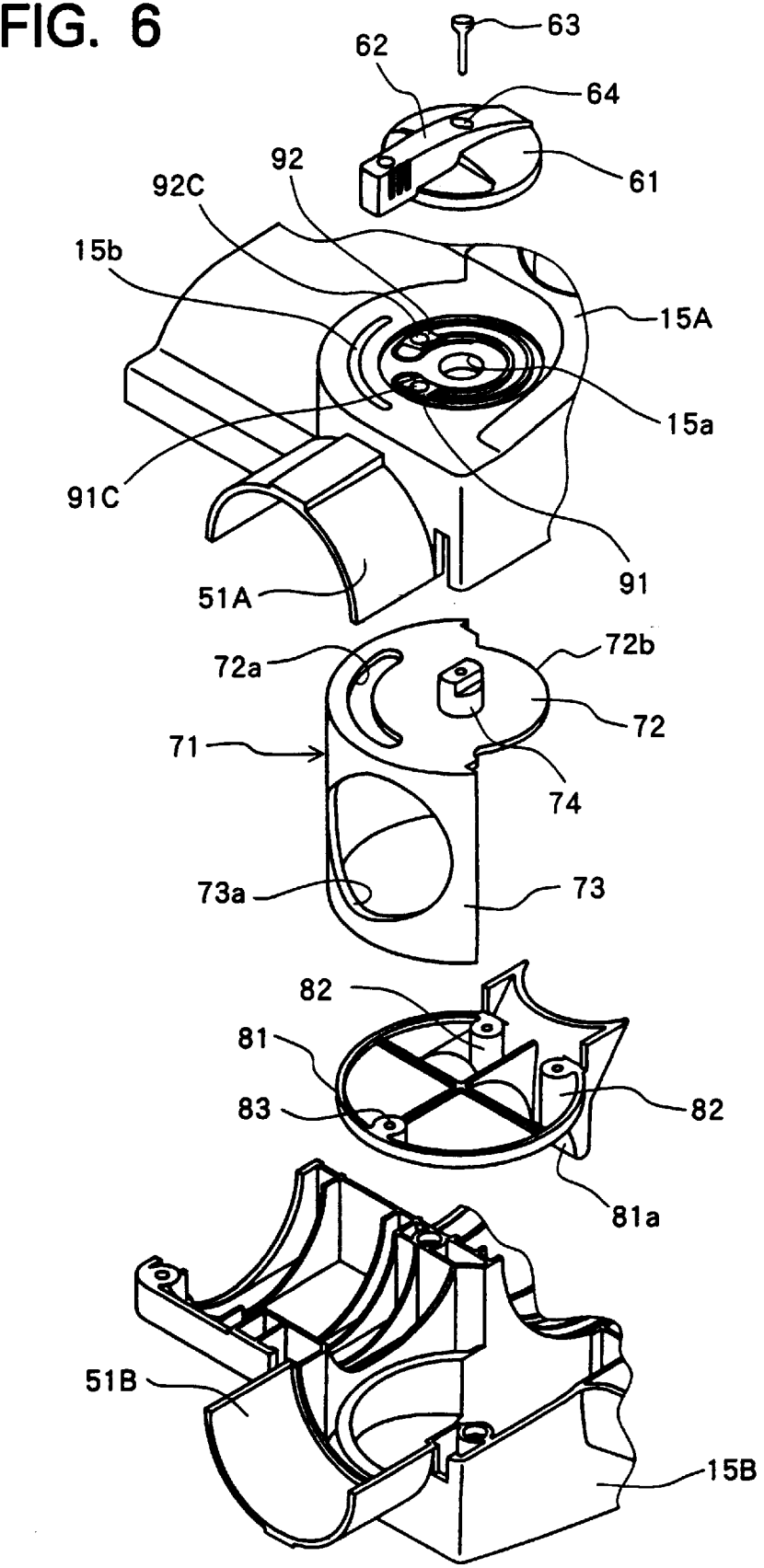
FIG. 6 is an exploded perspective view showing an essential portion of the blower-vacuum apparatus according to the first embodiment.

A front end of the blower nozzle 30 serves as a blower port 30a, and the rear end of the blower nozzle 30 is inserted into the collar 17. Further, the vacuum nozzle 40 is provided integrally with the blower nozzle 30 so as to extend parallel with the blower nozzle 30. A front end of the vacuum nozzle 40 serves as a vacuum port 40a, and the rear end of the vacuum nozzle is inserted into the collar 16. The blower nozzle 30 and the vacuum nozzle 40 have elongated configurations. The blower nozzle 30 is tapered such that a diameter thereof is gradually reduced toward the blower port 30a in order to increase air velocity blowing through the blower nozzle 30. On the other hand, the vacuum nozzle 40 has a constant diameter along its length. The dust port 18 of the branch chamber 15 is fitted with a dust nozzle 51 to which the dust bag 50 is connected. Incidentally, the main body 10 is constituted by complementary halves, and as shown in FIG. 6, the branch chamber 15 is divided into a right side branch chamber 15A and a left side branch chamber 15B, and the dust nozzle 51 is divided into a right side dust nozzle 51A and a left side dust nozzle 51B.

A change-over mechanism 60 is provided at the branch chamber 15. The change-over mechanism 60 primarily includes a change-over lever 61, a shield member 71, and a guard plate 81. The change-over lever 61 is rotatably supported to an outer side of the branch chamber 15. The lever 61 includes a knob portion 62 and is formed with a thread hole 64 through which a screw 63 extends. A projecting portion 65 (FIG. 8) protrudes toward a wall of the branch chamber 15 from a surface of the change-over lever 61, the surface being in confrontation with the wall of the branch chamber 15.

The branch chamber 15 is formed with a central opening 15a and an arcuate recess 15b concentric therewith. Further, a pair of arcuate resilient plates 91, 92 are provided concentrically with the central opening 15a and at symmetrical positions so as to equally subdivide the arcuate recess 15b. The arcuate recess 15b is adapted to enable a user to recognize the rotational limits of the knob portion 62 as shown in FIG. 1. Each resilient plate 91, 92 includes a slant surface 91a, 92a and a top portion 91b, 92b contiguous with the slant surface. Each top portion 91b, 92b is formed with a concave portion 91c, 92c with which a free end of the projecting portion 65 is resiliently engageable. A blower mode is entered when the projecting portion 65 is brought into engagement with the concave portion 91c upon rotation of the change-over lever 61, and a vacuum mode is entered when the projecting portion 65 and the concave portion 92c engage.

The shield member 71 is rotatably disposed within the branch chamber 15 and includes a top plate 72 and a shielding portion 73. The top plate 72 has a generally circular shape with a partially cut away portion, and is provided with a cylindrical protrusion 74 threadingly engaged with the screw 63 extending through the central opening 15a. The top plate 72 is formed with an arcuate slot 72a concentric with the cylindrical protrusion 74. Accordingly, the change-over lever 61 is integrally connected to the shield member 71 by means of the screw 63. The shielding portion 73 serves to shut off air stream, and has a hollow cylindrical shape with a partially cut away portion. Further, a circular opening 73a is formed in the cylindrical wall. The shielding member 71 can be switched between a vacuum mode position (FIGS. 2 and 3) in which the shielding portion 73 shuts off the opening of the collar 17 and the circular opening 73a is in communication with the dust port 18, and a blower mode position (FIGS. 4 and 5) in which the shielding portion 73 shuts off the dust port 18.

The guard plate 81 is positioned internally of the top plate 72 for covering a major surface and a peripheral edge portion 72b of the top plate 72. This arrangement can prevent dust contained in the air passing through the branch chamber 15 from being entered into a space between the top plate 72 and the wall of the branch chamber 15 and between the wall of the branch chamber 15 and the change-over lever 61. Therefore, change-over operation of the change-over lever will not be obstructed by dust. The guard plate 81 has a pair of threaded portions 82, 82 and a single threaded portion 83. A pair of screws 84, 84 extend through the wall of the branch chamber 15 and are threadingly engaged with the pair of treaded portions 82, 82. The screw 85 is threadingly engaged with the threaded portion 83, extends through the arcuate slot 72a, and is threadingly engaged with a threaded boss 15A provided at the wall of the branch chamber 15. Thus, the guard plate 81 is fixed to the branch chamber 15. The arcuate slot 72a is required, so that the screw 85 will not interrupt the rotation of the shield member 71. The guide plate 81 has a deflection surface 81a facing the air passage 13a of the fan case 13 for smoothly introducing air supplied from the air passage 13a into the branch chamber 15.

Figure 2:
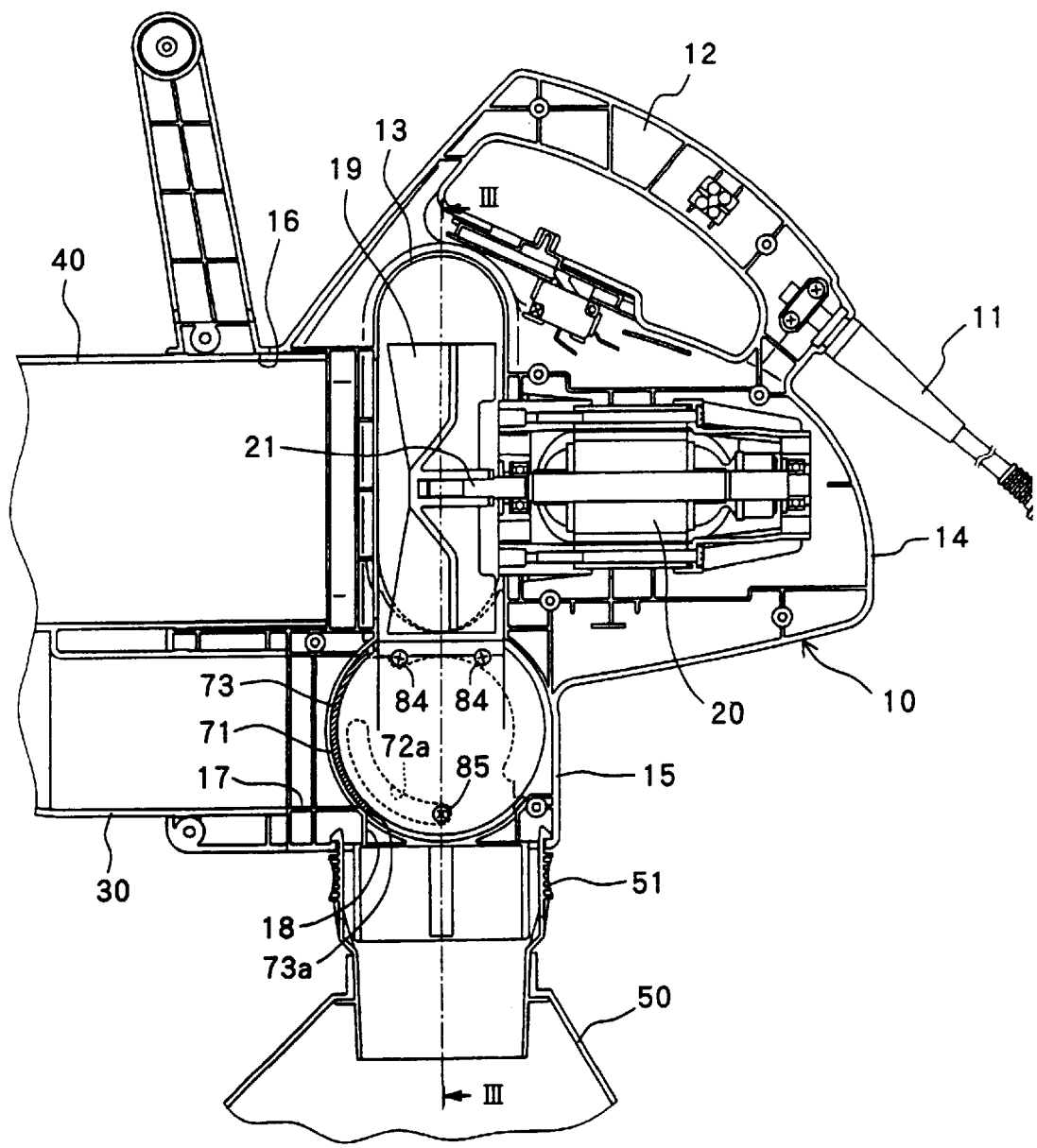
FIG. 2 is a cross-sectional view showing the blower-vacuum apparatus in its vacuum mode according to the first embodiment.

With this arrangement, in a state where the projecting portion 65 of the change-over lever 61 is engaged with the concave portion 92c, the vacuum mode is maintained where the shield member 71 is maintained at its vacuum mode position. That is, as shown in FIGS. 2 and 3, the shielding portion 73 of the shield member 71 shuts off the opening of the cover 17 while the circular opening 73a is in communication with the dust port 18. With this state, if the motor 20 is energized upon turning ON a start switch not shown, the fan 19 is rotated, so that the air and dust are sucked through the suction port 40a of the vacuum nozzle 40 and are introduced into the fan case 13 where the dust pulverized by the fan 19. Then, the air and dust pass through the scrolled passage 13a and reach the branch chamber 15.

In this case, the deflection surface 81a of the guard plate 81 smoothly guide the air and the dust, and at the same time, dust can be prevented from entering into the space between the top plate 72 and the wall of the branch chamber 15 because the guard plate 81 covers the top plate portion 72 of the shield member 72. Thus, change-over operation of the change-over mechanism 60 can be maintained. Because the shielding portion 73 of the shield member 71 shuts off the opening of the collar 17, the sucked air and dust do not enter into the blower nozzle 30, but is smoothly introduced into the dust bag 50 through the circular opening 73a of the shield member 71, the dust port 18, and the dust nozzle 51.

Figure 7:
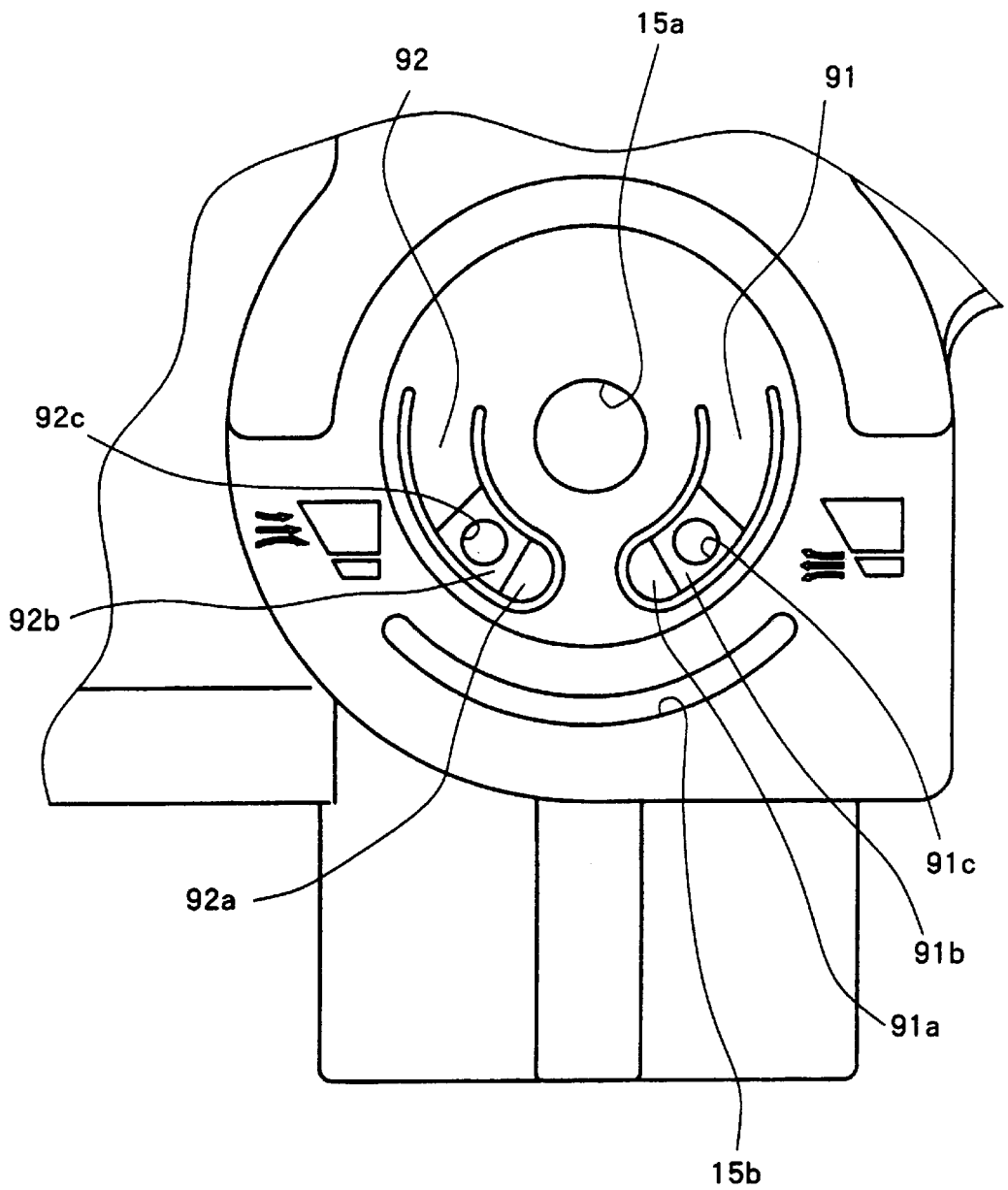
FIG. 7 is a partial side view showing a change-over mechanism in the blower-vacuum apparatus according to the first embodiment.
Figure 8A:
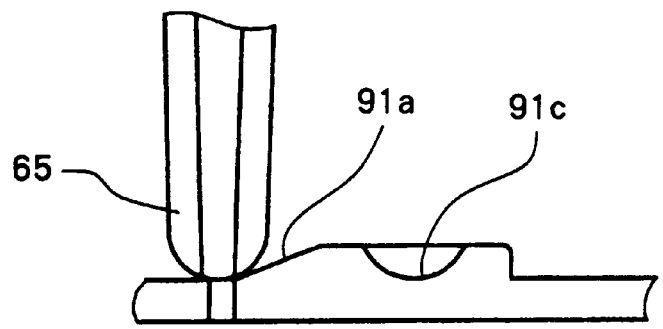
Figure 8B:
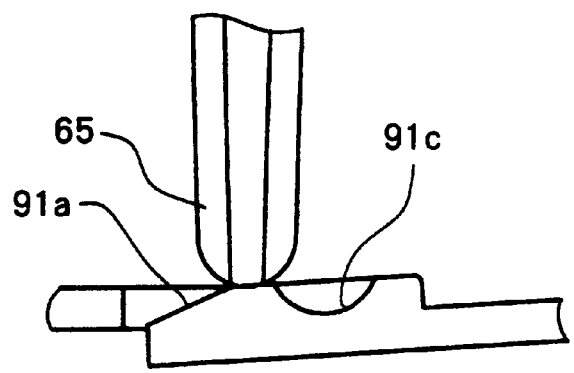
Figure 8C:
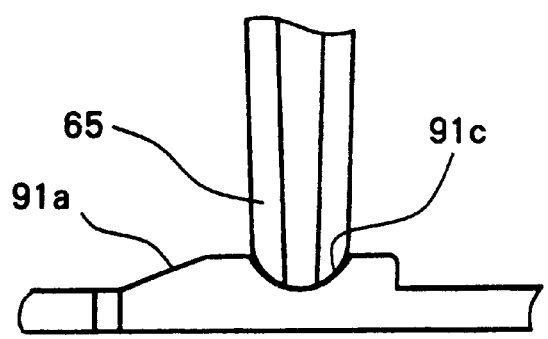

Next, if the knob portion 62 of the change-over lever 62 is rotated in a counterclockwise direction in FIG. 7 from the state where the projecting portion 65 of the change-over lever 61 engages the concave portion 92c, the free end of the projecting portion 65 is disengaged from the concave portion 92c and then, as shown in FIGS. 8A through 8C, the free end of the projecting portion 65 gradually slides up and over the slant surface 91a and finally engages with the concave portion 91c. By this engagement, the blower mode is maintained. By the rotation of the change-over lever 61, the shield member 71 is also rotated within the branch chamber 15, so that its shielding portion 73 shuts off the dust port 18. In this state, the shielding portion 73 is not in confrontation with the opening of the collar 17. Thus, the fan case 13 is in communication with the blower nozzle 30 while the fan case 13 is out of communication with the dust bag 50.

With this state, if the motor 20 is energized, the fan 19 is rotated as in the vacuum mode, so that air is sucked through the suction port 40a of the vacuum nozzle 40 and introduced into the fan case 13. The sucked air passes through the scrolled passage 13a and reaches the branch chamber 15. The air is then introduced into the blower nozzle 30 through the opening of the collar 17, and is blown from the blower port 30a. Because air is sucked from the suction port 40a of the vacuum nozzle even during the blower mode, and therefore, there is a possibility that dust may be sucked in with the air. However, since the blower nozzle 30 has a tapered configuration in which its diameter gradually declines toward the blower port, air velocity blowing from the blower nozzle 30 is higher than air velocity sucked into the vacuum nozzle 40. Accordingly, large dust and the like will not be sucked in through the suction port 40a during the blower mode.

Figure 9:
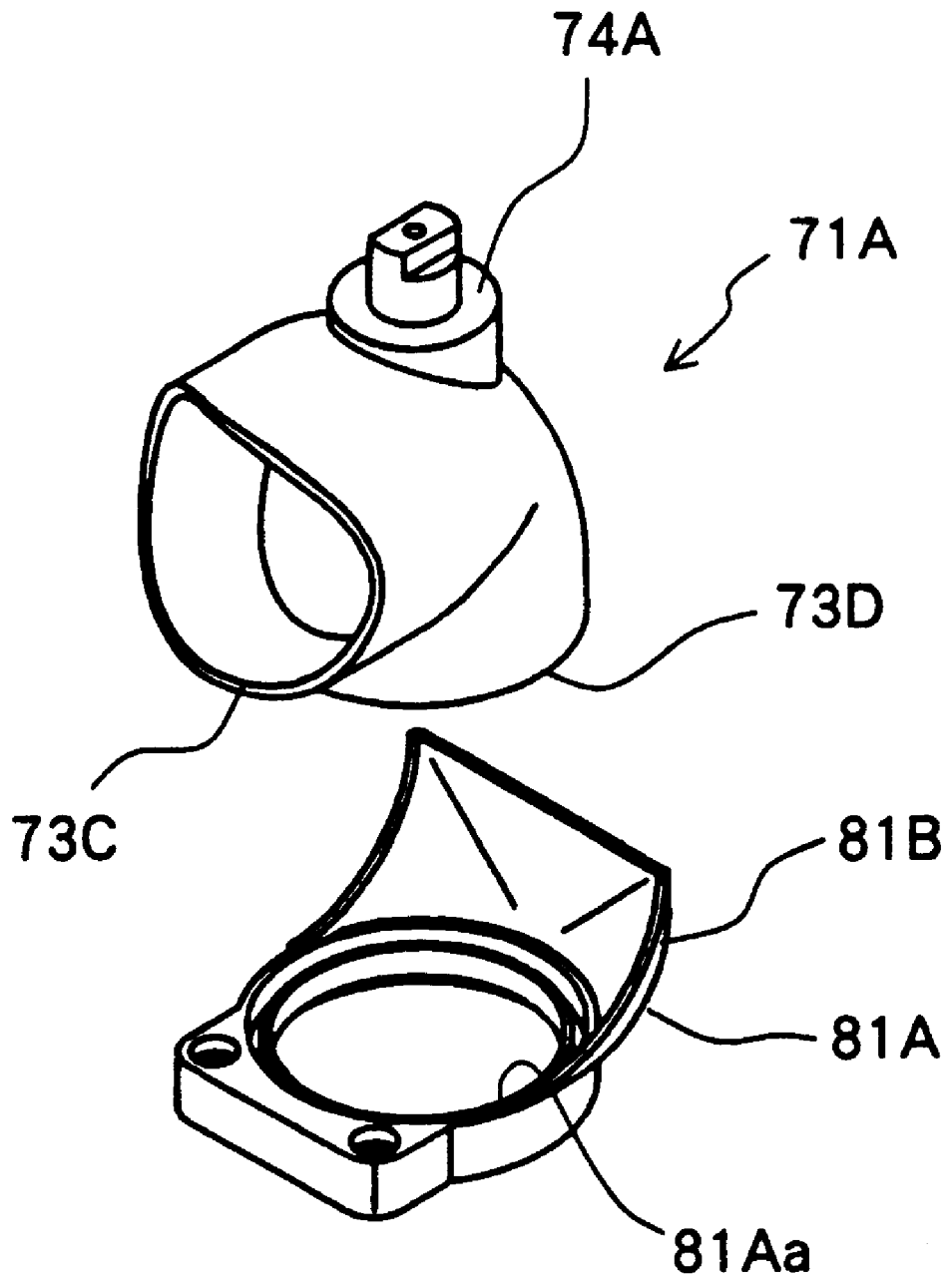
FIG. 9 is an exploded perspective view showing a shield member and a guard member used in a blower-vacuum apparatus according to a second embodiment of the present invention.

A blower-vacuum apparatus according to a second embodiment of the present invention will next be described with reference to FIG. 9. The second embodiment pertains to a modification to the shield member 71 and the guard plate 81 of the first embodiment. Other configuration is identical with that of the first embodiment. That is, in the second embodiment, a shield member 71A is an L-shaped bending tube having one end formed with an opening 73C selectively communicable with one of the opening of the collar 17 and the dust port depending upon the rotation of the change-over lever 61, and having another end formed with an opening 73D which is normally open to the scrolled air passage 13a. A protrusion 74A protrudes from the bending portion so that the shield member is connected to the change-over lever 61. Further, the guard member 81A is fixed to the left side branch chamber 15B by means of a screw not shown. The guard member 81A is formed with an opening 81Aa through which the other open end 73D passes. The guard member 81A provides a guard plate 81B which covers the shield member 71A. The guard plate 81B prevents the dust contained in the air in the branch chamber 15 from entering into the protruding portion 74A and degrading rotational movement of the shield member 71A.

A blower-vacuum apparatus according to a third embodiment of the present invention will next be described with reference to FIGS. 10 through 12. As shown FIG. 12, the blower-vacuum apparatus 101 of the third embodiment also includes a blower nozzle 130 having a front blower port 130a and a vacuum nozzle 140 having a front suction port 140a. The blower and vacuum nozzles 130, 140 extend in parallel with each other and are provided integrally with a housing 113. A handle 112 is integrally provided with the housing 113, and a change-over lever 161 is provided to the housing 113 for changing operation mode between blower mode and vacuum mode.

The housing 113 accommodates therein a motor 120 and an impeller 119 connected to an output shaft of the motor. If the impeller 119 is made of a durable plastic material, leaves and most debris entering the apparatus can be comminuted. If the impeller is formed from a steel blade, a more durable comminuting means can be provided.

The output shaft of the motor 120 extends in a direction perpendicular to the blower nozzle 130 and the vacuum nozzle 140. An air blower side 119a is provided at a peripheral portion of the impeller 119 and in confrontation with the blower nozzle. Further, an air inlet side 119b is provided at an upper portion of the impeller 119 and in communication with the one end of the vacuum nozzle 140. The housing 113 is formed with an air inlet port 113a. Therefore, if the impeller 119 is rotated, air is sucked from the air inlet side 119b of the impeller 119 and the sucked air is discharged from the air blower side 119a of the impeller 119.

An air introduction port 113b is formed at an upper portion of the housing 113 and at the end of the vacuum nozzle 140. In the vacuum nozzle 140 a first shield plate 173 is pivotally movably supported. That is, the first shield plate 173 is pivotally movable by a change-over lever 161 between a vacuum mode position, in which the first shield plate shields the air introduction port 113b, and a blower mode position, in which the first shield plate opens the air introduction port 113b and blocks fluid communication between the vacuum nozzle 140 and the impeller 119.

A dust port 118 is formed in the housing 113 at a position close to a base end of the blower nozzle 130, and a dust bag 150 is connected to the housing at a position below the dust port 118. The dust bag 150 is formed from a porous material whose porosity is sufficient to allow air to pass therethrough but also sufficient to impede the flow of pulverized leaves, dirt and dust therethrough. Further, a second shield member 174 is pivotally movably provided in the housing for selectively shielding the dust port 118. That is, the second shield plate 174 is movable between a vacuum mode position and a blower mode position. In the vacuum mode position communication between the blower nozzle 130 and the impeller 119 is blocked by the second shield plate 174 when the first shield plate 173 is at its vacuum mode position. In the blower mode position the dust port 118 is blocked by the second shield plate 174 when the first shield plate 173 is at its blower mode position.

Figure 10:
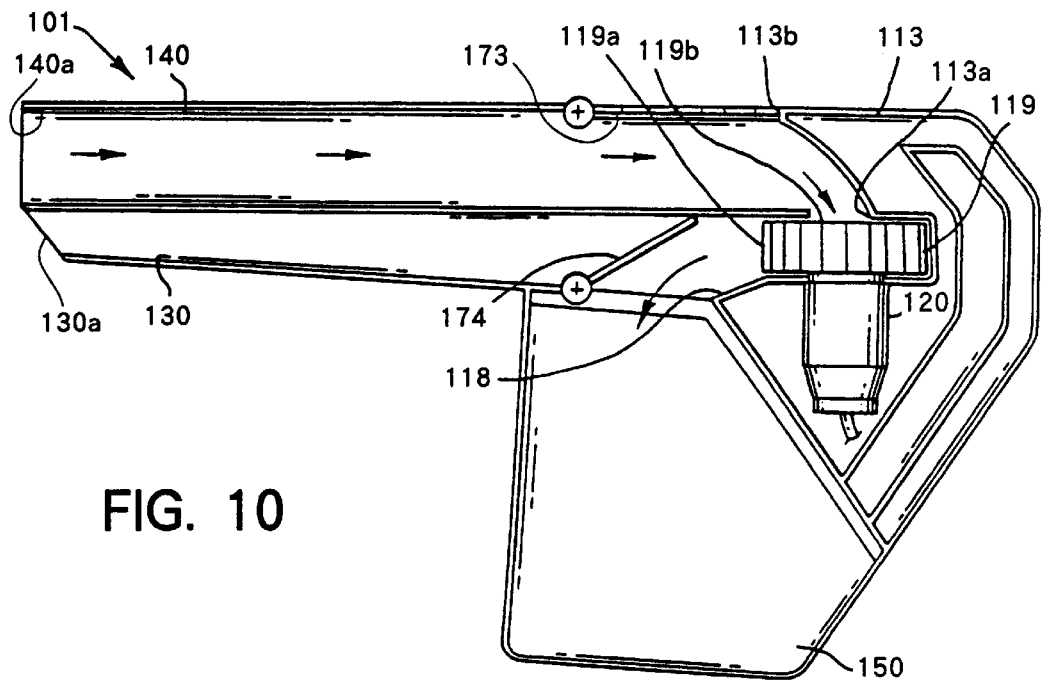
FIG. 10 is a schematic view showing a blower-vacuum apparatus in its vacuum mode according to a third embodiment of the present invention.

Under the operation of the vacuum mode as shown in FIG. 10, the first shield plate 173 shields the air introduction port 113b, and as a result, the suction port 140a is in fluid communication with the impeller 119. That is, the air inlet side 119a of the impeller 119 is in fluid communication with the suction port 140a of the vacuum nozzle 140. Further, the second shield plate 174 blocks the blower nozzle 130 and opens the dust port 118. That is, the air blower side 119a of the impeller 119 is in communication with the dust bag 150. Therefore, if the impeller 119 is rotated, air is not introduced through the air introduction port 113b, but air is introduced through the suction port 140a of the vacuum nozzle 140 The sucked air, leaves and organic deposits are then pulverized at the impeller 119, i.e., mulching is performed. The thus pulverized material passes through the dust port 118 and is collected in the dust bag 150.

Figure 11:
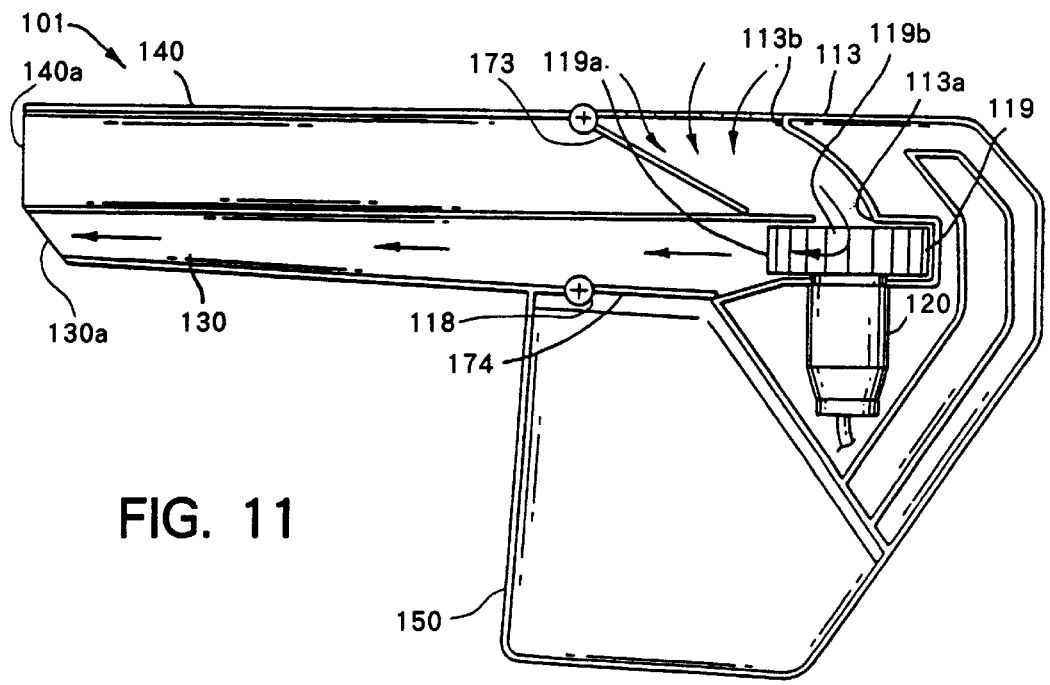
FIG. 11 is a schematic view showing the blower-vacuum apparatus in its blower mode according to the third embodiment.
Figure 12:
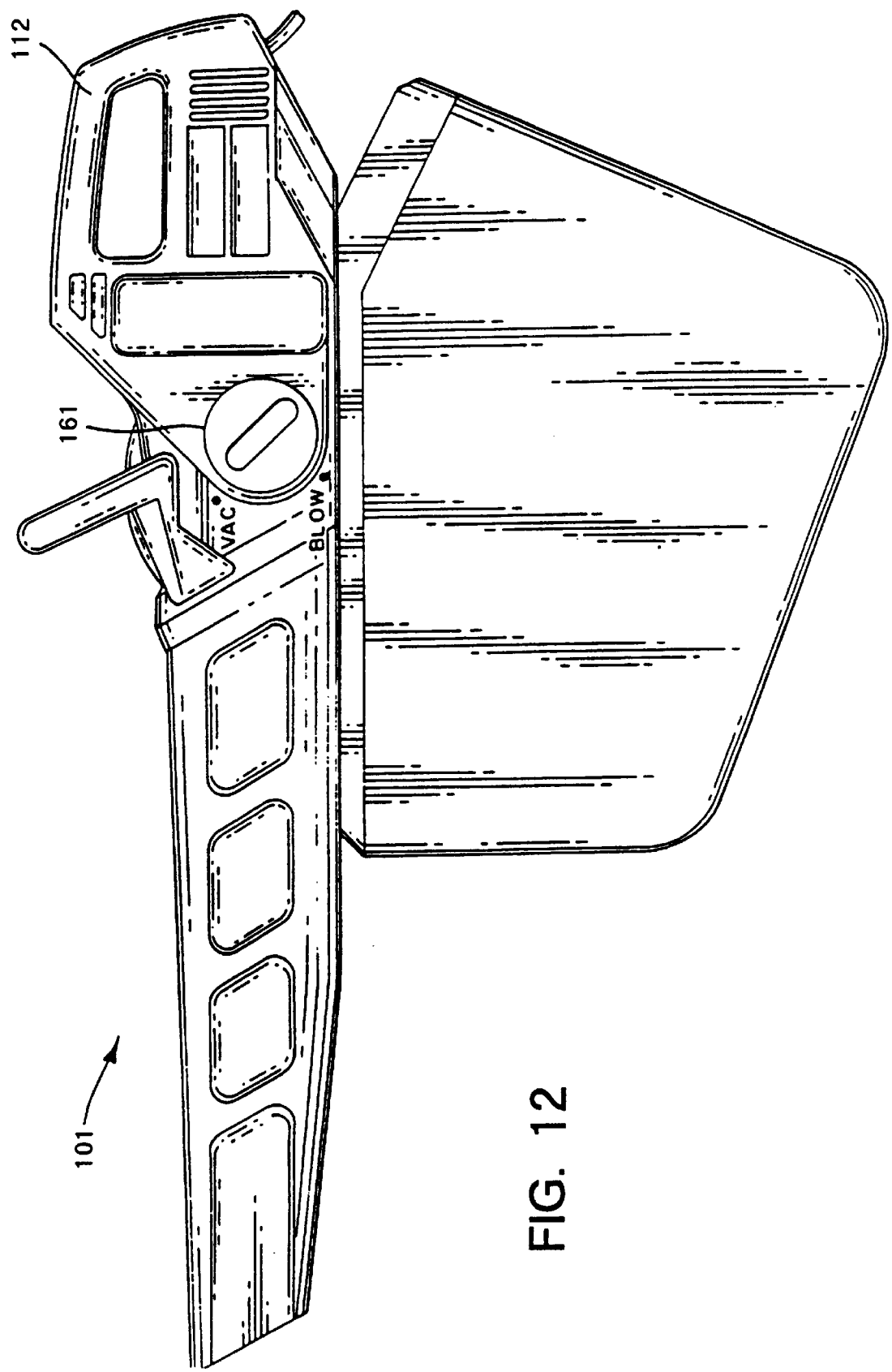
FIG. 12 is a side view showing the blower-vacuum apparatus according to the third embodiment.

On the other hand, during the blower mode operation shown in FIG. 11, the first shield plate 173 opens the air introduction port 113b, and blocks fluid communication between the suction port 140a and the impeller 119. Further, the second shield plate 174 provides fluid communication between the blower port 130a of the blower nozzle and the air blower side 119a of the impeller 119, and blocks the dust port 118. Accordingly, if the impeller 119 is rotated, air is sucked through the air introduction port 113b positioned spaced away from the suction port 140a, and the sucked air is not directed into the dust bag 150 but is directed toward the blower port 130a.

A blower-vacuum apparatus according to a fourth embodiment of the present invention will next be described with reference to FIGS. 13 and 14. In the fourth embodiment, a change-over mechanism 260 for switching between the air blow and suction is provided as a single assembly, and a vacuum nozzle, a blower nozzle, and a main body accommodating therein a motor and a fan are detachably provided to the assembly.

The change-over mechanism 260 has a housing 260A provided with a vacuum nozzle connecting portion 140A and a blower nozzle connecting portion 130A. The housing 260A has an upper arcuate portion where a plurality of air introduction ports 213b are formed. Further, a change-over lever 261 is pivotally movably disposed in the housing 260A. The change-over lever 261 is integrally provided with an arcuate shield plate 273 whose shape is in conformance with the upper arcuate portion of the housing 260A. The shield plate 273 is movable by the pivotal movement of the change-over lever between a blower mode position where the shield plate shuts off the vacuum nozzle connecting portion 140A and a vacuum mode position where the shield plate shuts off the air introduction ports 213b.

Another shielding member 274 is movably provided in an interlocking relation with the pivotal movement of the change-over lever 261 for selectively shielding the blower nozzle connecting portion 130A, the moving direction of the shielding member 274 being in a longitudinal direction of the blower nozzle. That is, the housing 260 has an opening 130B coaxial with the blower nozzle connecting portion 130A. If the change-over lever 261 is pivotally moved to the blower mode position shown in FIG. 13, the shielding member 274 is moved away from the opening 130B in order to open the opening 130B, and simultaneously, a bottom portion 274A of the shielding member 274 shuts off a dust port (not shown). If the change-over lever 261 is pivotally moved to the vacuum mode position shown in FIG. 14, the shielding member 274 is moved for shutting off the opening 130B and for opening the dust port.

Figure 13:
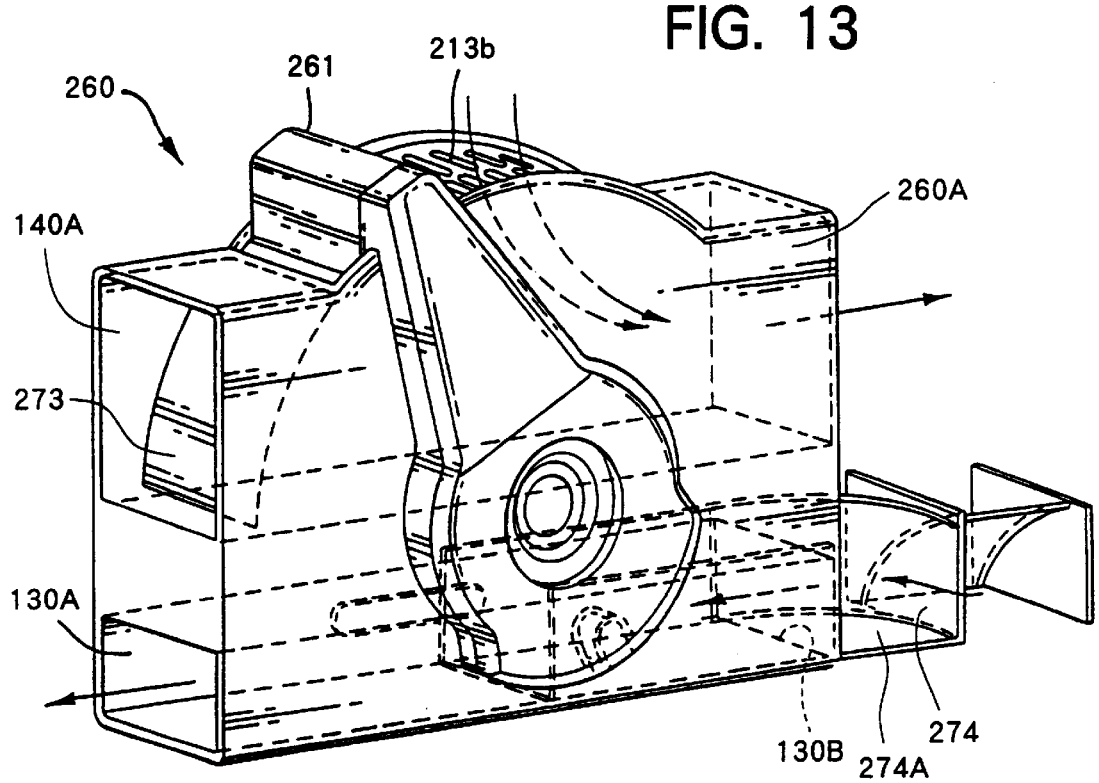
FIG. 13 is a perspective view showing a blower-vacuum apparatus in its blower mode according to a fourth embodiment of the present invention.
Figure 14:
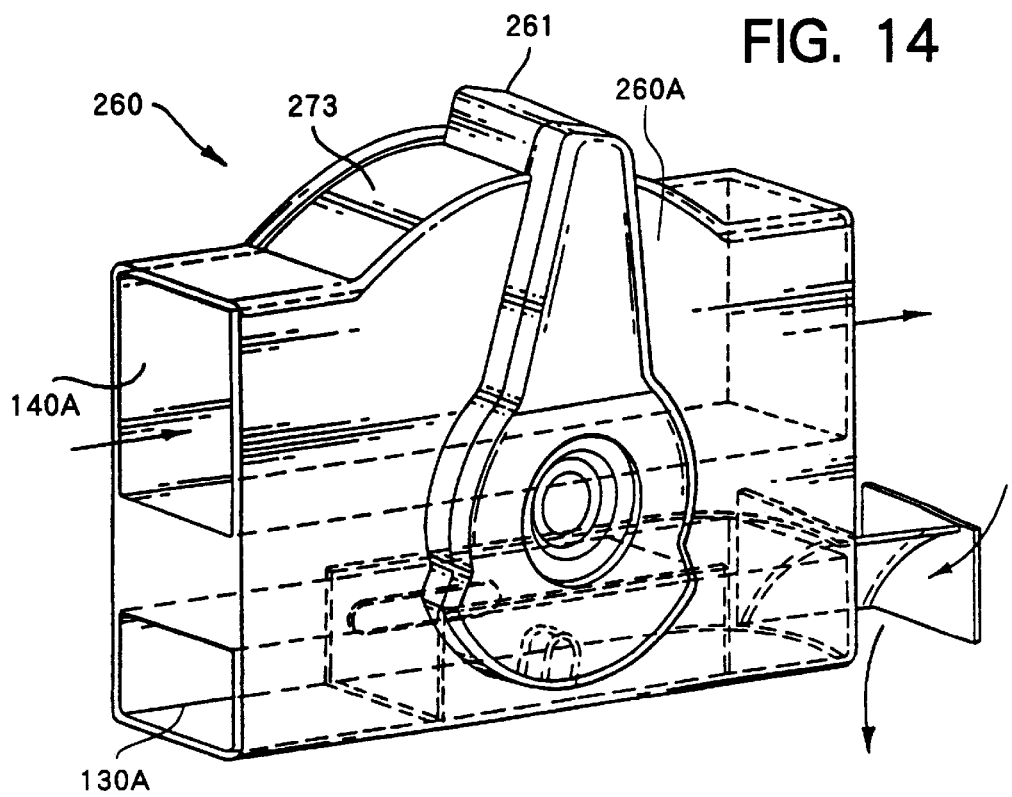
FIG. 14 is a perspective view showing the blower-vacuum apparatus in its vacuum mode according to the third embodiment.
Figure 15:
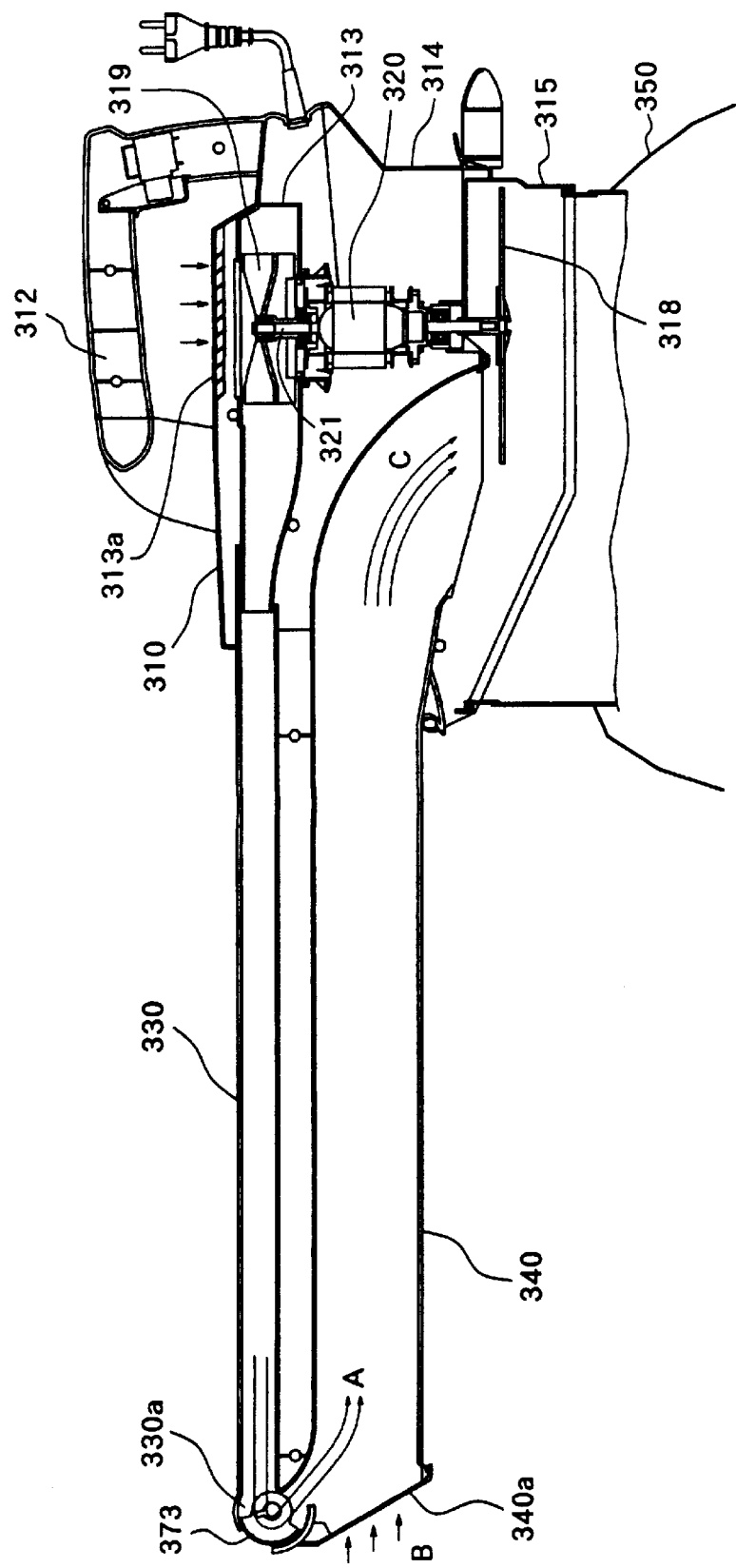
FIG. 15 is a cross-sectional view showing a conventional blower-vacuum apparatus in its vacuum mode.
Figure 16:
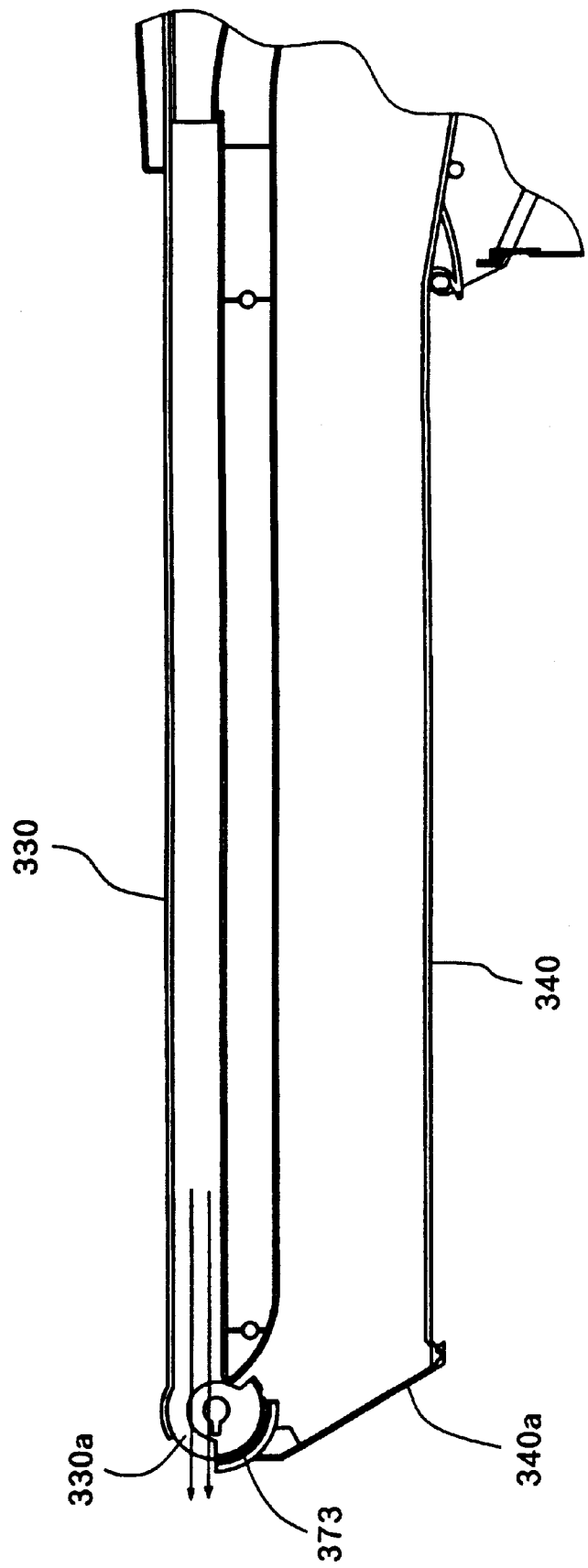
FIG. 16 is a cross-sectional view showing the conventional blower-vacuum apparatus in its blower mode.

As shown in FIG. 13, if the change-over lever 261 is frontwardly tilted, the air introduction ports 213 are open, while the shield plate 273 shuts off the vacuum nozzle connecting portion 140A. Simultaneously, the shielding member 274 is moved rightwardly in FIG. 13 for opening the opening 130B. Accordingly, external air is introduced into the housing through the air introduction ports 213*b*, passes through the impeller (not shown) and then through the opening 130B, and is directed to the blower nozzle (not shown). On the other hand as shown in FIG. 14, if the change-over lever 261 is tilted rearwardly, the air introduction ports 213*b* are blocked by the shield plate 273 and the vacuum nozzle connecting portion 140A is opened. Simultaneously, the shielding member 274 is moved leftwardly for blocking the opening 130B.

The present invention is not limited to the above described embodiment, but various changes and modifications may be made therein without departing from the scope of the invention. For example, according to the first and second embodiments, air sucked from the suction port 40*a* of the vacuum nozzle 40 is introduced into the blower nozzle 30 by the change-over mechanism 60 in the blower mode. However as a modification, a rotation axis of the fan is directed perpendicular to the longitudinal direction of the vacuum nozzle 40 and the blower nozzle 30, and a fan is disposed at an upper portion of a fan case and an air inlet port is formed at the upper portion of the fan case. Further, a change-over mechanism is provided for opening and closing the air inlet port and for opening and closing the vacuum nozzle. In the blower mode, while the vacuum nozzle is closed and the air inlet port is opened by the change-over mechanism, the air is sucked through the air inlet port by the rotation of the fan and the sucked air is introduced into the blower nozzle. With this arrangement, suction of dust from the suction port of the vacuum nozzle can be avoided in the blower mode.

Further, as a modification to the shield member 71 in the first embodiment, an annular rib outwardly protruding from the peripheral surface of the shielding portion can be integrally formed around a contour of the circular opening 73*a*, and the annular rib may be provided engageably with the dust port 18 or the collar 17 because of resilient deformation. With such a structure, leakage of dust can be eliminated.

Furthermore as a modification to the guard member 81 in the first embodiment, a skirt-like sleeve portion can be provided to avoid scattering of the dust toward any portion in the apparatus. More specifically in the guard member 81 shown in FIG. 6, a skirt-like sleeve portion is integrally suspended from the generally circular edge portion of the guard member, so that the cylindrical shielding portion 73 of the shield member 71 surrounds the skirt-like sleeve portion. Further, the skirt portion is formed with a pair of circular holes having shapes in conformance with the circular opening 73*a* of the shield member 71, the pair of circular holes being displaced by 90 degrees to each other in a circumferential direction of the skirt portion so as to secure fluid passage directing to either the dust bag 50 or the blower nozzle 30 in accordance with the change-over operation of the shield member 71. With this arrangement, the skirt portion serves as a blocking wall which prevents the dust from directly impinging against the wall of the branch chamber 15, and as a result, dust can be prevented from scattering around in the apparatus.

Moreover, in this case, the skirt portion can be formed integrally with outwardly projecting annular ribs around the pair of circular holes. With this arrangement, the shield member 71 is rotatingly moved while sliding over end faces of the annular ribs, that is, a gap with a distance corresponding to the protruding length of the annular ribs is provided between the shield member 71 and the skirt-like sleeve portion. Accordingly, even if dust enters between the skirt-like sleeve portion and the shield member, damage to the sliding surface can be reduced and dust removal work can be facilitated. This is an advantage of the skirt-like sleeve portion having annular ribs over the direct sliding arrangement in which the inner peripheral surface of the shield member is in direct contact with the outer peripheral surface of the skirt like sleeve due to the non provision of the annular ribs.

Furthermore, in the third embodiment, the shield plates 173 and 174 are pivotally moved by the change-over lever 161. However, separate change-over mechanisms can be provided for respectively controlling the pivotal movement of these shield plates.

INDUSTRIAL APPLICABILITY

As described above, the blower-vacuum apparatus according to the present invention is particularly advantageous in removing leaves, twigs, grass clippings and other organic accumulation from the surface of lawns and patios, while providing excellent portability and operability.

What is claimed is:

1. A blower-vacuum apparatus comprising:

a main body;

a blower nozzle having one end connected to the main body and another end formed with a blower port;

a vacuum nozzle extending in parallel with an provided integrally with the blower nozzle, the vacuum nozzle having one end connected to the main body and another end formed with a suction port;

a fan rotatably supported in the main body;

a dust bag connected to the main body for receiving dust laden air which has passed through an entire length of the vacuum nozzle from the suction port and for collecting the dust; and the improvement comprising:

a change-over mechanism provided in the main body for selectively providing one of a vacuum mode position in which the air sucked from the suction port is directed to the dust bag, wherein the air is directly sucked exclusively from the suction port during the vacuum mode by the rotation of the fan, and a blower mode position in which the sucked air is directed to the blower nozzle; wherein the change-over mechanism comprises a change-over lever positioned outside of the main body and pivotally movably supported to the main body at its supporting portion, a shield member rotatable disposed in the main body and connected to the change-over lever for passing or blocking the sucked air, the shield member having a wall portion in confrontation with the supporting portion of the main body; and a guard member positioned in the main body and fixed thereto for preventing the dust from being entered into a space between the wall portion and the supporting portion at which the change-over lever is supported, the wall portion being covered by the guard member.

2. The blower-vacuum apparatus as claimed in claim 1, wherein the blower port has a cross-sectional area smaller than that of the suction port.

3. A blower vacuum apparatus comprising:

a housing having an air introduction port for air blowing and a dust port for air suction;

an impeller having an air inlet side and an air blower side, the air inlet side being selectively communicable with the air introduction port and the air blower side being selectively communicable with the dust port;

a motor for driving the impeller;

a vacuum nozzle connected to the housing adjacent the inlet side of the impeller;

a blower nozzle connected to the housing adjacent the blower side of the impeller;

a first shield member switchable between a first position where the first shield member closes the air introduction port and provides fluid communication between the vacuum nozzle and the air inlet side and a second position where the first shield member opens the air introduction port and shuts off a fluid communication between the vacuum nozzle and the air inlet side; and a second shield member switchable between a first switch position where the second shield member opens the dust port and shuts off a fluid communication between the blower nozzle and the blower side and a second switch position where the second shield member closes the dust port and provides a fluid communication between the blower nozzle and the blower side; and change-over interlocking means for interlockingly switching the second shield member to its first switch position upon switching of the first shield member to its first position for providing a vacuum mode, and for interlockingly switching the second shield member to its second switch position upon switching of the first shield member to its second position for providing a blower mode.

* * * * *